United States Patent [19]

Imai et al.

[11] 4,124,393
[45] Nov. 7, 1978

[54] SHIFTED ANTHRAQUINONE DYE DEVELOPING AGENTS

[75] Inventors: Shinichi Imai; Seiki Sakanoue, both of Minami Ashigara, Japan

[73] Assignee: Fuji Photo Film Co., Ltd., Minami Ashigara, Japan

[21] Appl. No.: 620,678

[22] Filed: Oct. 8, 1975

[30] Foreign Application Priority Data

Oct. 8, 1974 [JP] Japan ................... 49-115778

[51] Int. Cl.² ................... G03C 1/10; G03C 1/40; G03C 7/00; G03C 5/54
[52] U.S. Cl. ................... 96/77; 96/3; 96/29 D; 96/99
[58] Field of Search ................... 96/3, 29 D, 77, 99

[56] References Cited

U.S. PATENT DOCUMENTS

| | | | |
|---|---|---|---|
| 2,983,605 | 5/1961 | Corley | 96/29 D |
| 3,076,808 | 2/1963 | Blout et al. | 96/29 D |
| 3,135,606 | 6/1964 | Blout et al. | 96/29 D |
| 3,209,016 | 9/1965 | Blout et al. | 96/29 D |
| 3,236,865 | 2/1966 | Jarrett | 96/29 D |
| 3,239,339 | 3/1966 | Dershowitz | 96/29 D |
| 3,307,947 | 3/1967 | Idelson et al. | 96/29 D |
| 3,429,872 | 2/1969 | Blout et al. | 96/29 D |
| 3,431,107 | 3/1969 | Weyerts | 96/29 D |

FOREIGN PATENT DOCUMENTS 804,973 11/1958 United Kingdom ................... 96/29 D

*Primary Examiner*—Richard L. Schilling
*Attorney, Agent, or Firm*—Sughrue, Rothwell, Mion, Zinn and Macpeak

[57] ABSTRACT

Photographic dye developing agents represented by the following formula (I):

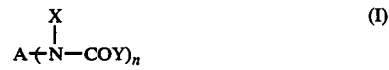

wherein A represents an anthraquinone dye moiety, X represents a hydrogen atom, an aliphatic hydrocarbon group, an alicyclic hydrocarbon group, an aryl group or a heterocyclic group, at least one of A and X contains an o-dihydroxyphenyl group or a p-dihydroxyphenyl group as a dye developing agent moiety, n is an integer of 1 to 4, and COY represents a group which is released from the nitrogen atom at a pH of above 9.

31 Claims, 3 Drawing Figures

SHIFTED ANTHRAQUINONE DYE DEVELOPING AGENTS

BACKGROUND OF THE INVENTION

1. Field of the Invention

The present invention relates to dye developing agents and particularly to novel dye developing agents utilized for photographic materials for a color diffusion transfer process.

2. Description of the Prior Art

Generally, dye developing agents are compounds which have a developing agent portion capable of developing silver halide and a dye portion and which can be diffused in photographic layers during development; they are fixed in portions of a photosensitive material in a color diffusion transfer process which correspond to exposed silver halide during development (after exposure) and retain their diffusibility in unexposed silver halide areas to give a transferred image on an image receiving element.

In a diffusion transfer image forming process, a photosensitive element comprising at least one silver halide emulsion layer is processed with a processing solution, e.g., immersion, coating, spraying, flowing, etc., after exposure, and is placed upon an image receiving element comprising a dye receiving layer to provide a dye diffusion transfer image thereon either before, after or during processing. In practice, the photosensitive element comprises at least one silver halide layer and a dye developing layer in combination with the silver halide layer, and a processing solution is uniformly coated therebetween when the photosensitive element is placed upon the image receiving element. The processing solution is commonly contained in a capsule which is ruptured to spread the processing solution between the stacked elements, i.e., the photosensitive element and the image receiving element.

A photosensitive material using a dye developing agent which has an absorption in the spectrally sensitized wavelength range of a silver halide emulsion which has been spectrally sensitized to red light, green light or blue light, together with a silver halide emulsion intrinsically having such spectral sensitivity, is practically designed so that the photographic transfer images can be viewed from the exposure side or from the reverse side. As means for combining such dye developing agents with such silver halide emulsions, there are, for example, (i) a method which comprises providing a silver halide photosensitive emulsion layer adjacent the exposure side of a hydrophilic colloid layer which contains a dye developing agent which has an absorption in a spectrally sensitized wavelength range of the silver halide emulsion, (ii) a method which comprises providing a hydrophilic colloid layer containing a dye developing agent which has an absorption in a spectrally sensitized wavelength range of the silver halide emulsion adjacent the exposure side of a silver photosensitive emulsion layer and (iii) a method which comprises using such a silver halide emulsion layer containing such a dye developing agent. However, in methods (ii) and (iii) the apparent sensitivity of the silver halide photosensitive emulsion is considerably decreased due to a filter effect caused by light absorption of the dye developing agent, which is conventionally used in large amounts.

To overcome such defects, U.S. Pat. No. 3,307,947 proposes the use of azotype magenta dye developing agents which have a spectral absorption peak in the short wavelength range before processing due to a hydroxyl group (auxochrome in the azotype magenta dye developing agent) being acylated, whereby apparent desensitization at exposure due to the filter effect is decreased while the long wavelength absorption required for image formation is recovered by development processing after exposure. Since the azotype magenta dye developing agent is of the temporary short wavelength absorption type (the hydroxyl group (auxochrome) being temporarily acylated), the bathochromic effect thereof is insufficient when it is changed into the temporary short wavelength absorption type, though it has the advantage that the acyl group is easily released during development to recover its color.

On the other hand, a dye developing agent having an amino group (an auxochrome having a sufficient bathochromic effect) is easily chemically changed into a short wavelength absorption type dye developing agent by conventional acylation. However, it has the serious defect that the color is not recovered at development because an amide bond is strong as compared with an ester bond. For example, U.S. Pat. No. 2,983,605 discloses that an aminoanthraquinone dye developing agent is changed into a short wavelength absorption type dye developing agent by benzoylation of the amino group, but such chemically altered dye developing agent does not recover its original color under development conditions.

SUMMARY OF THE INVENTION

A first object of the present invention is to provide novel dye developing agents which are temporarily chemically altered so as to have sufficient absorption in the short wavelength range, i.e., sufficient so as not to reduce the spectral sensitivity of any dye sensitized silver halides used.

A second object of the invention is to provide novel chemically altered dye developing agents whose color can be sufficiently and rapidly recovered under development conditions.

A third object of the invention is to provide novel chemically altered stable dye developing agents whose color is not recovered during storage of photosensitive materials containing the same.

A fourth object of the invention is to provide novel chemically altered dye developing agents which form dye images (for example, cyan images) having an absorption in a preferred long wavelength range due to color recovery in development processing, i.e., since dye developing agents are altered to shift the absorption thereof toward the short wavelength region sufficiently so as not to reduce the spectral sensitivity of the silver halide in processing (developing), the dye developing agents recover their original absorption due to a shift in the absorption of the altered dye development toward the long wavelength region equivalent to the earlier shift except, of course, in the reverse direction.

A fifth object of the invention is to provide novel chemically altered dye developing agents which are easily dispersed in hydrophilic colloids.

A sixth object of the invention is to provide novel chemically altered dye developing agents which form transfer images having no fog or color stain and which have high image density.

A seventh object of the invention is to provide color photosensitive materials for diffusion transfer processing which contain such novel chemically altered dye developing agent.

These and other objects of the present invention are attained by using a photographic developing agent represented by the following formula (I):

wherein A represents an anthraquinone dye moiety, X represents a hydrogen atom, an aliphatic hydrocarbon group, an alicyclic hydrocarbon group, an aryl group or a heterocyclic group, where at least one of A and X contains an o-dihydroxyphenyl group or a p-dihydroxyphenyl group as a developing moiety, n is an integer of 1 to 4, and COY represents a moiety which is released from the nitrogen atom at above pH 9.

DETAILED DESCRIPTION OF PREFERRED EMBODIMENTS OF THE INVENTION

In the above formula, A represents an anthraquinone dye moiety, for example, a residue of an anthraquinone dye or a residue of an anthraquinone derivative having a 5- or 6-membered fused heterocyclic rings, such as an anthrapyrimidine, an anthrapyridone, a pyrazolanthrone, etc., residue, preferably heterocyclic rings which contain 1 or 2 nitrogen atoms as hetero atoms. Examples of such dyes include those described in U.S. Pat. Nos. 3,239,339 and 3,076,808. X represents a hydrogen atom, an aliphatic hydrocarbon group, an alicyclic hydrocarbon group, an aryl group or a heterocyclic group, and at least one of A and X contains an o-dihydroxyphenyl group or a p-dihydroxyphenyl group as a dye developing agent moiety. n represents an integer of 1 to 4 and COY represents an acyl group which is released from the nitrogen atom at above pH 9.

The aliphatic hydrocarbon group as X can be a substituted or unsubstituted aliphatic hydrocarbon group such as an alkyl, alkenyl or alkinyl group having 1 to 20, preferably 1 to 10 carbon atoms which may have substituents such as a halogen atom, a carboxyl group, a hydroxyl group or an amide group, etc.

The alicyclic hydrocarbon group as X can be a substituted or unsubstituted 5- or 6-membered alicyclic hydrocarbon group. Substituents for this group are the same as those described for the above aliphatic hydrocarbon group. Examples of such substituents include halogen atoms such as a chlorine atom or a bromine atom, a carboxyl group, a hydroxyl group and an amide group, further, alkyl groups with preferably up to 5 carbon atoms such as a methyl group or an ethyl group can be used.

The aryl group as X can be a monocyclic or bicyclic aryl group such as a phenyl or naphthyl group. The aryl group may be substituted or unsubstituted. Examples of the substituents include halogen atoms such as chlorine, bromine or iodine, lower alkyl groups with preferably up to 5 carbon atoms such as methyl, ethyl or propyl, lower alkoxy groups with preferably up to 5 carbon atoms such as methoxy, ethoxy or propoxy, a hydroxyl group, a carboxy group or an amide group.

The heterocyclic group as X can be a substituted or unsubstituted heterocyclic group. Examples of the substituents include alkyl groups, preferably with up to 5 carbon atoms, halogen atoms, a hydroxyl group, a carboxyl group and an amide group. Examples of the heterocyclic groups include 5- or 6-membered heterocyclic groups such as hetero rings of the furan, pyrrole, thiazole, imidazole and pyridine, etc., series.

Examples of Y in COY include a trifluoromethyl, phenoxy, substituted phenoxy, β-halogenoethoxy (preferably β-chloro or β-bromo), β-sulfonylethoxy and a carboxyl group. Preferred substituted phenoxy groups include those with a halogen atom such as a chlorine atom or bromine atom, an alkyl group preferably having up to 5 carbon atoms, such as methyl group, a nitro group, a cyano group, etc.

Examples of classes of anthraquinone dye residues or derivatives thereof useful in the present invention include anthraquinone—9,10)dye residues and anthraquinone dye derivatives fused with a heterocyclic group at the 1,9-positions thereof The objects of the present invention are attained using the following photosensitive materials for a color diffusion transfer process containing the dye developing agent of the present invention. Namely, the objects of the present invention are attained by the use of photosensitive materials for color diffusion transfer which are exposed to light through the base thereof and which have a photosensitive element comprising at least one photosensitive layer unit composed of a hydrophilic colloid layer containing one or more dye developing agents having an absorption in the spectrally sensitized wavelength region of a silver halide emulsion, the hydrophilic colloid layer containing one or more dyes developing agents being towards the base of the photosensitive element and a silver halide emulsion layer adjacent the hydrophilic colloid layer, which are characterized in that the hydrophilic colloid layer contains at least one dye developing agent of the present invention.

Preferred dye developing agents are represented by the following formulae (II) to (VI).

-continued

In formulae (II) to (VI), A, X and n have the same meaning as described above. R represents an aliphatic hydrocarbon group, an alicyclic hydrocarbon group as earlier described for X or an aryl group as earlier described for X, wherein the aliphatic hydrocarbon group can be the same as the aliphatic hydrocarbon group earlier described for X and can be substituted or unsubstituted, and most preferably is an alkyl group having 1 to 20 carbon atoms, which may have substituents such as an amide group, a hydroxy group, a carboxyl group or an alkoxy group, preferably having up to 5 carbon atoms. Z represents a hydrogen atom, a halogen atom (such as a chlorine atom) or a lower alkyl group, preferably having up to 5 carbon atoms, such as a methyl group, and m is an integer of 1 to 3.

Compounds represented by formula (II) are particularly preferred for use.

The dye developing agents of the present invention can be used in various photosensitive materials for color diffusion transfer processing. For example, they can be used not only for photosensitive materials where an image receiving element is stripped off for viewing from the negative element after transfer, but also for photosensitive materials where the image receiving element is not stripped off. "Non-stripping" photosensitive materials are viewed from the reverse side of the side from which exposure was effected, and are superior to photosensitive materials which are viewed from the exposure side because optical inversion of a mirror image in the camera is not required. However, in order to obtain photosensitive materials having preferred color separation, an image receiving layer an area where a processing solution can be spread, a blue-sensitive emulsion layer, a hydrophilic colloid layer containing a yellow dye developing agent, a green-sensitive emulsion layer, a hydrophilic colloid layer containing a magenta dye developing agent, a red-sensitive emulsion layer and a hydrophilic colloid layer containing a cyan dye developing agent are arranged, in this order. Such photosensitive material must be exposed to light at the side of the dye developing agent containing layer rather than the emulsion layer, that is, the side reverse to the image receiving layer. In this case, it is important, in preparing a high speed photosensitive material for color diffusion transfer processing, that the dye developing agent be of the temporary short-wavelength absorption type which does not absorb a spectral wavelength range of the emulsion layer associated therewith.

In the following, preferred examples of the dye developing agents of the present invention are set forth.

Compound 1

Compound 2

Compound 3

Compound 4

Compound 5

Compound 6

Compound 7

Compound 8

Compound 9

Compound 10

Compound 11

Compound 12

Compound 13

-continued

Compound 14

Compound 15

Compound 16

Compound 17

Compound 18

-continued

Compound 19

One characteristic of the novel temporary short wavelength absorption type dye developing agents of the present invention is that color is easily regained under development conditions and they change into dyes having a sufficient bathochromic effect after color recovery, i.e., the altered dye developing agent having an absorption in the short wavelength region recovers its original absorption in the long wavelength region.

Such dye developing agents are colorless, yellow or magenta before development processing, but assume a yellow, magenta or cyan color, respectively after development processing.

Figure 1:
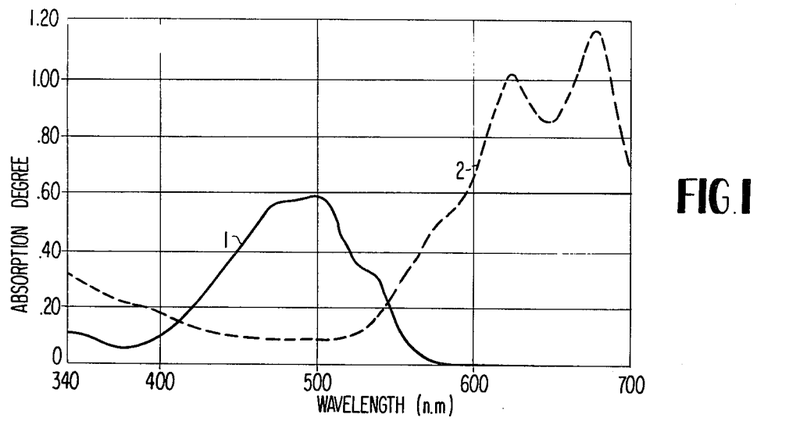
FIG. 1 shows spectral absorption curves of the dye developing agent of the present invention in acetone and acetone containing alkali.

In FIG. 1, curve (1) is the spectral absorption curve of one dye developing agent (Compound 4) of the present invention in an acetone solution, where the absorption maximum is 500 nm, and curve (2) is the spectral absorption curve in acetone containing alkali at a pH substantially equal to that at development conditions (acetone:1N NaOH = 9:1 (volume ratio)), where the absorption maximum changes to 630 nm and 676 nm, i.e., the color changes from reddish-yellow to cyan color.

Figure 2:
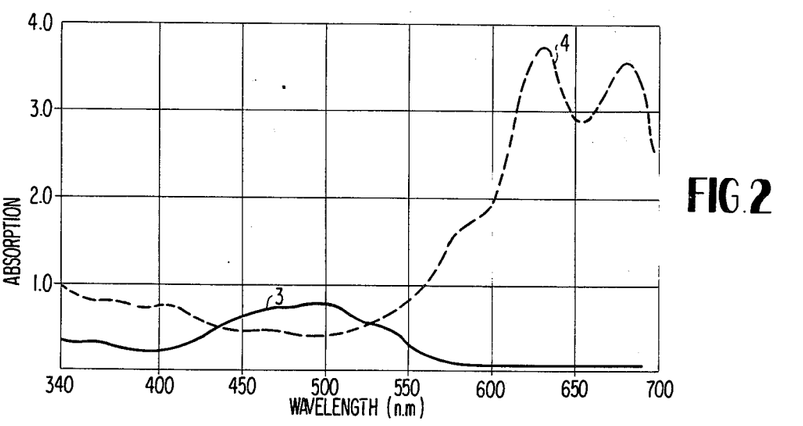
FIG. 2 shows spectral absorption curves of the dye developing agent of the present invention and Compound A, for comparison, in the coated state.
Figure 3:
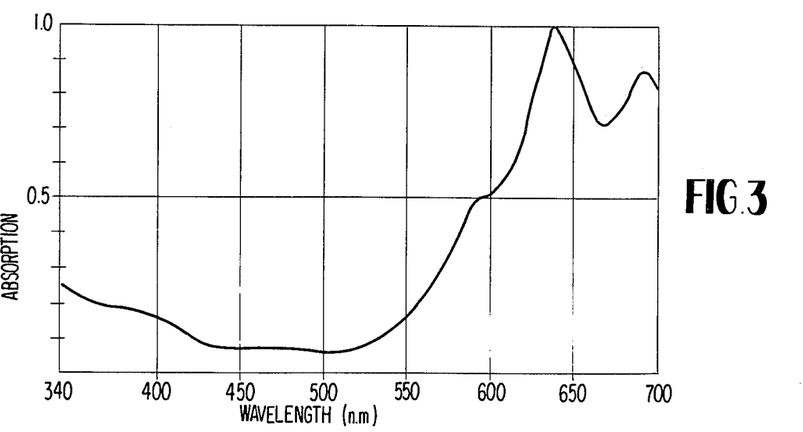
FIG. 3 shows the spectral absorption curve of color diffusion transfer images produced using the dye developing agent of the present invention.

FIG. 2 and FIG. 3, which are explained in more detail in the examples hereinafter described, show the spectral absorption curve of a dye developing agent (Compound 4) of the present invention in a photosensitive material before processing and the spectral absorption curve of the transfer image resulting therefrom. They establish that the dye developing agents of the present invention are excellent temporary short wavelength absorption type dye developing agents.

The dye developing agent of the present invention is used in a hydrophilic colloid layer in an amount of about $2 \times 10^{-3}$ to about $6 \times 10^{-1}$ mols, preferably $4 \times 10^{-2}$ to $3 \times 10^{-1}$ mols, per 100 g of hydrophilic colloid (for example, gelatin). Further, it is used in an amount of about 0.03 to 5 mols, preferably 0.1 to 0.5 mol, per mol of silver halide in the silver halide emulsion layer, i.e., in the case of using dye developing agents, the dye developing agents are fixed (not transferred) according to the amount of developing silver.

The dye developing agents of the present invention can be prepared by reacting amino group containing anthraquinone dyes with acid halides or acid anhydrides.

Specifically, the dye developing agents represented by formula (II) can be synthesized by reacting a substituted sulfonyl ethyl haloformate with an amino group-containing anthraquinone dye. The substituted sulfonyl ethyl haloformate and the amino group-containing anthraquinone dye are each used in a stoichiometric amount and the substituted sulfonyl ethyl haloformate can be added directly, or as a solution, to a solution of the amino group-containing anthraquinone dye in an organic solvent, with stirring, to react the same. The reaction temperature is 0° C. to 200° C., preferably 50° C. to 100° C., when reaction is at atmospheric pressure. As the solvent used in the above described reaction, there are benzenes such as benzene, toluene or chlorobenzene, esters such as ethyl acetate, tetrahydrofuran, dioxane, acetonitrile and dimethyl formamide, etc. Typically, from 5 to 50 times (by weight) of solvent based on the amino group-containing anthraquinone dye developing agent is used.

Compounds (II) to (VI) illustrated above can be synthesized by the reaction of an acid chloride or anhydride corresponding to the compounds of formulae (II) to (VI) with an amino group-containing anthraquinone dye developing agent as disclosed in U.S. Pat. Nos. 3,209,016, 2,983,605, 3,236,864, 3,253,001, 3,236,865, 3,135,605, 3,255,205, 3,347,673, 3,347,672, 3,246,016, 3,239,339 and 3,076,808. An acid chloride or anhydride can be reacted in an amount of about 1 to about 3 times equevalent to the amino group in the amino-containing anthraquinone dye developing agent at temperatures of about 50° to 100° C. under atmospheric pressure. This reaction can be completed when the maximum absorption (max) of the non-altered amino-containing anthraquinone is minimized.

The substituted sulfonyl ethyl haloformates used to synthesize the dye developing agents represented by the formula (II) are represented by the formula (IIa):

$$X_1COOCH_2CH_2SO_2R \qquad (IIa)$$

wherein $X_1$ represents a halogen atom, such as a chlorine atom or a bromine atom, and R represents an aliphatic hydrocarbon group, an alicyclic hydrocarbon group or an aryl group, as earlier defined for formulae (II) and (V).

The term aliphatic hydrocarbon group includes a substituted and unsubstituted aliphatic hydrocarbon group, preferably a lower alkyl group having 1 to 4 carbon atoms (for example, a methyl group, an ethyl group or an isopropyl group). Examples of substituents include halogen atoms, a nitro group, acylamino groups and alkoxy groups, preferably alkoxy groups having up to 4 carbon atoms.

The term alicyclic hydrocarbon group includes substituted and unsubstituted 5- or 6-membered alicyclic ring. Substituents therefor are the same as those for the above-described aliphatic hydrocarbon group.

The term aryl group includes monocyclic and bicyclic substituted or unsubstituted aryl groups. Substituents therefor are the same as those for the above-described aliphatic hydrocarbon group.

On the other hand, the amino group-containing anthraquinone dyes are dyes which contain one or more amino groups (which can be substituted or unsubstituted amino groups) in their molecule, as described in, for example, U.S. Pat. Nos. 3,209,016, 2,983,605, 3,236,864, 3,253,001, 3,236,865, 3,135,605, 3,255,205, 3,347,673, 3,347,672 and 3,246,016. Further, the anthraquinone dyes include anthraquinone derivatives having a fused 5- or 6-membered heterocyclic ring, such as anthrapyrimidone, as described in, for example, U.S. Pat. Nos. 3,239,339 and 3,076,808.

Synthesis examples of dye developing agents of the present invention, particularly dye developing agents represented by formula (II), are illustrated in more detail in the following. All syntheses were at atmospheric pressure.

Synthesis 1 (Synthesis of Compound 4)

5.7 g of 1,4-bis-[γ-(hydroquinonylpropylamino)]-5,8-dihydroxyanthraquinone and 7.4 g of phenylsulfone ethyl chloroformate were added to 200 ml of acetonitrile and the mixture was refluxed while heating until the cyan color thereof changed to orange (about 2 hours). After completion of the reaction, acetonitrile was removed by distillation and 20 ml of ethyl acetate added to the residue to form a solution. The solution was added dropwise to 200 ml of benzene and precipitated crystals separated by filtration. The crystals were recrystallized from a benzene-ethyl acetate mixture (1:1, volume) to obtain 5.2 g of the object compound having a 106–109° C. melting point.

Synthesis 2 (Synthesis of Compound 7)

5.4 g of 1,4-bis-[γ-(hydroquinonyl)propylamino]anthraquinone and 7.9 g of β-(p-tolylsulfone)ethylchloroformate were added to 200 ml of acetonitrile and the mixture refluxed while heating until the cyan color thereof changed to yellow (about 2 hours). After completion of the reaction, acetonitrile was removed by distillation and 20 ml of ethyl acetate added to the residue to form a solution. This solution was added dropwise to 200 ml of benzene and precipitated crystals separated by filtration. The crystals were recrystallized from a benzene-ethyl acetate mixture (1:1, volume) to obtain 3.7 g of the object compound having a 113°–117° C. melting point.

The primary effects and advantages of the present invention are as follows.

Firstly, it is possible to obtain temporary short wavelength absorption type dye developing agents which have a light absorption in a short wavelength range at exposure, where lowered absorption of active rays caused by a filter effect on the photosensitive emulsion layers is lessened.

Secondly, it is possible to obtain temporary short wavelength absorption type dye developing agents which are stable in photosensitive materials before processing but give good color reproduction upon processing, providing hues having the desired long wavelength absorption.

Thirdly, it is possible to obtain temporary short wavelength absorption type dye developing agents which are easily dispersed in hydrophilic colloids, particularly as a fine grain dispersion.

Fourthly, it is possible to obtain temporary short wavelength absorption type dye developing agents which are fixed in exposed silver halide emulsion areas of an image-wise exposed photosensitive material but which are diffusible in non-exposed silver halide emulsion areas.

Fifthly, it is possible to obtain high speed photosensitive materials.

Sixthly, it is possible to obtain photosensitive materials for color diffusion transfer processing which exhibit stable photographic properties, as it is not mandatory to increase sensitivity.

Seventhly, it is possible to obtain photosensitive materials for color diffusion transfer processing which store well.

Eighthly, it is possible to obtain photosensitive materials for color diffusion transfer processing from which color images having less color fog and less color stain, excellent hue and high color density can be obtained.

Ninthly, it is possible to obtain photosensitive materials for color diffusion transfer processing having good granularity and good image sharpness.

The dye developing agents of the present invention can be used together with various dye developing agents in photosensitive materials for color diffusion transfer processing, if desired, examples of such various dye developing agents including:

1-Acetoxy-2-{p-[β-(hydroquinonyl)ethyl]phenylazo}-4-n-propoxynaphthalene
1-Acetoxy-2-{p-[β-(hydroquinonyl)ethyl]phenylazo}-4-methoxynaphthalene
1-Acetoxy-2-[p-(2',5'-dihydroxyphenoxy)phenylazo]-4-methoxynaphthalene
1-(o-carboxyphenyl)-3-phenyl-4-[p-(2',5'-bis-trifluoroacetoxy-β-phenylethyl)phenylazo]-5-hydroxypyrazole lactone
1-(o-Carboxyphenyl)-3-phenyl-4-[p-(β-hydroquinonylethyl)phenylazo]-5-hydroxypyrazole lactone
1-(o-Carboxyphenyl)-3-carboxyanilide-4-[p-(β-hydroquinonylethyl)phenylazo]-5-hydroxypyrazole lactone
3-Acetoxy-3-(2-coumaronyl)-2-[4-(2-hydroquinonylethyl)phenylazo]acrylonitrile
2-[p-(β-hydroquinonylethyl)phenylazo]-3-acetoxy-benzothiophene
2-[m-(Hydroquinonylmethyl)phenylazo]-3-acetoxybenzothiophene, and various dye developing agents as are described in U.S. Pat. Nos. 3,307,947 and 3,230,085, West German Patent Publication (OLS) 2,260,203.

On the other hand, dye developing agent precursors which release diffusible onium salt type dyes as described in U.S. Pat. No. 3,698,897 and Japanese Patent Publications 66441/1973 and 33826/1973 can be used to prepare photosensitive materials for color diffusion transfer processing in combination with the temporary short wavelength absorption type dye developing agents of the present invention which are prepared by chemically altering an aminoanthraquinone dye or aminoanthrapyrimidone dye. As dye developing agent precursors which have been chemically altered, there are those of formulae (VII) to (XI).

$$A'—COY \quad (VII)$$
$$A'—COCF_3 \quad (VIII)$$

(IX)

$$A'—COCOOR \quad (X)$$
$$A'—COCOOH \quad (XI)$$

Y in formula (VIII) has the same meaning as in formula (II), Z and m in formula (IX) have the same meaning as in formula (IV), and R in formula (X) has the same meaning as in formula (V). A' in the formulae (VIII) to (XI) represents a residue of the above-described dye developing agent precursor, a hydrogen atom of the amino group in the aminophenol portion thereof being removed, for example:

The chemically altered dye developing agent precursors can be used, if desired, together with the dye developing agents of the present invention in photosensitive materials for color diffusion transfer processing.

In general, the dye developing agents of the present invention are dispersed in a hydrophilic colloid or colloids by the following methods. The dye developing agents are dispersed as fine particles by adding a solution (about 5 to 90% dye developing agent) of the dye developing agent in an organic solvent to an aqueous solution of the hydrophilic colloid or colloids. (The organic solvent used can be a volatile solvent such as ethyl acetate, tetrahydrofuran or methyl ethyl ketone, which can be removed upon drying the photographic layers.) Alternatively, the method described in U.S. Pat. Nos. 2,322,027 and 2,801,171 can be used where a water-soluble solvent such as dimethylformamide or 2-methoxyethanol is removed by water washing as described in U.S. Pat. Nos. 2,949,360 and 3,396,027.

However, it is advantageous, for stabilizing the dispersion of the dye developing agent and accelerating the dye image forming steps, to add the dye developing agent to a solvent which is substantially water-insoluble and has a boiling point above 200° C. at normal pressure and to emulsify the dye developing agent therein. Examples of such solvents include dibutyl phthalate, tricresyl phosphate, trihexyl phosphate and N,N-diethyl lauramide. It is preferred, to accelerate the dissolution of the dye developing agent, to use mixtures of the above described volatile or water-soluble solvents.

Further, oleophilic polymers may be used instead of or in combination with such solvents having a high boiling point.

As such polymers, polyester resins prepared by polycondensing polyhydric alcohols with polybasic acids can be used. It is also possible to use polyvinyl pyrrolidone, polyvinyl acetate, polyvinyl propionate, polyvinyl butyral, polyvinyl chloride, polyacrylic acid ester, polymethacrylic acid ester, nitrocarboxymethyl cellulose, N-vinyl pyrrolidone-acrylic acid-methyl acrylate terpolymers, vinyl phthalimide-acrylic acid copolymers, cellulose acetate hydrogen phthalate, poly-N-methyl methacrylamide, dimethylaminoethyl methacrylate-acrylic acid copolymers, dimethylaminoethyl methacrylate-acrylic acid-butyl acrylate copolymers, N,N-diethylacrylamide-acrylamide copolymers, poly-N-methylacrylamide copolymers, N-methylacrylamide-N-hydroxymethyl acrylamide copolymers, poly-N-ethylacrylamide, methyl vinyl ketone-acrylamide copolymers and N-vinyl pyrrolidone-methacrolein copolymers.

In general, colloid mills, high pressure homogenizers or ultrasonic emulsification devices can be used to prepare dispersions of fine particles of the dye developing agents. Further, anionic surface active agents can be used as emulsification assistants. The particle size of the fine particles of the dispersed dye developing agent is such that more than 8% of the particles are below 1 $\mu$, preferably below 0.5 $\mu$.

As the hydrophilic colloid used to disperse the dye developing agents, there are gelatin, colloidal albumin, casein, cellulose derivatives such as carboxymethyl cellulose or hydroxyethyl cellulose, agar-agar, sodium alginate, sugar derivatives such as starch derivatives, and synthetic hydrophilic colloids such as polyvinyl alcohol, poly-N-vinylpyrrolidone, polyacrylic acid copolymers, polyacrylamides or derivatives thereof and partially hydrolyzed products thereof, etc. If desired, these colloids can be used as a compatible mixture of two or more thereof. Among these colloids, gelatin is most conventionally used. However, a portion or all of the gelatin can be substituted for by synthetic high molecular materials or gelatin derivatives, e.g., gelatin modified by processing with reagents having a reactive group which can react with an amino group, an imino group, a hydroxy group or a carboxyl group present in the gelatin molecule or graft polymers prepared by linking molecular chains of other high molecular weight materials to gelatin.

As reagents for preparing the above-described gelatin derivatives, there are isocyanates, acid chlorides and acid anhydrides as described in U.S. Pat. No. 3,118,766, bromoacetic acid as described in Japanese Patent Publication No. 5514/1964, phenylglycidyl ethers as described in Japanese Patent Publication No. 26845/1967, vinylsulfone compounds as described in U.S. Pat. No. 3,132,945, N-allylvinylsulfonamides as described in British Pat. No. 861,414, maleimide compounds as described in U.S. Pat. No. 3,186,846, acrylonitriles as described in U.S. Pat. No. 2,594,293, polyalkylene oxides as described in U.S. Pat. No. 3,312,533, epoxy compounds as described in Japanese Patent Publication No. 26845/1967, acid esters as described in U.S. Pat. No. 2,763,639 and alkane sultones as described in British Pat. No. 1,033,189.

High molecular materials graftable to gelatin include those described in U.S. Pat. Nos. 2,763,625, 2,831,767 and 2,956,884, Polymer Letters 5, 595 (1967), Phot. Sci. Eng. 9, 148 (1965) and J. Polymer Sci., A-1, 9, 3199 (1971), and various polymers and copolymers of vinyl monomers such as acrylic acid, methacrylic acid and derivatives of such acids such as esters, amides or nitriles, and styrene. However, hydrophilic vinyl polymers having a high degree of compatibility with gelatin, such as polymers of acrylic acid, acrylamide, methacrylamide, hydroxyalkyl acrylate or hydroxyalkyl methacrylate, are particularly preferred.

If the dye developing agents of the present invention are used together with auxiliary developing agents, color diffusion transfer images having particularly preferred photographic properties can be obtained. As such auxiliary developing agents, hydroquinone derivatives, catechol derivatives and 1-phenyl-3-pyrazolidone derivatives which are known auxiliary developing agents can be used. Examples of such compounds are described in British Pat. No. 1,243,539, U.S. Pat. No. 3,253,915, Belgian Pat. No. 722,298, French Pat. No. 1,599,790 and Japanese Patent Publication Nos. 29130/1964 and 13837/1968. For example, the following compounds can be used:

phenylhydroquinone, 2'-hydroxyphenylhydroquinone, phenoxyhydroquinone, 4'-methylphenylhydroquinone, 1,4-dihydroxynaphthalene, 2-(4-aminophenethyl)-5-bromohydroquinone, 2-(4-aminophenethyl)-5-methylhydroquinone, 4',5-aminophenethylhydroquinone, 2,5-dimethoxyhydroquinone, 2,5-dibutoxyhydroquinone, m-xylohydroquinone, bromohydroquinone, 3,6-dichlorohydroquinone, 2-dimethylaminomethyltoluhydroquinone, 2-cyclohexylhdyroquinone, sec-butylhydroquinone, 2,5-dichlorohydroquinone, 2,5-diisopropylhydroquinone, 2,5-diiodohydroquinone, 3-chlorotoluhydroquinone, tetrachlorohydroquinone, 2,5-diphenylhydroquinone, 2,5-diresorcylhydroquinone, 2,5-dioctylhydroquinone, dodecylhydroquinone, 4-methoxycatechol, 4-isopropoxycatechol, 3-isopropylcatechol, 4-phenylcatechol, 3,6-dimethylcatechol, and 1,2-dihydroxy-5,8-methane-5,6,7,8-tetrahydronaphthalene.

Such auxiliary developing agents can be replaced by hydroquinone and derivatives thereof which are water-soluble for use together with the dye developing agents.

As water-soluble hydroquinones there are, for example, hydroquinone, hydroxyhydroquinone, chlorohydroquinone, methylhydroquinone, methoxyhydroquinone, hydroxymethylhydroquinone, aminohydroquinone hydrochloride, 2,5-diaminohydroquinone hydrochloride, aminomethylhydroquinone hydrochloride, aminoethylhydroquinone hydrobromide and 2,5-dihydroxythiophenol, etc.

Further, quinones and quinone derivatives can be used as auxiliary developing agents. For example, benzoquinone, phenylbenzoquinone, 4'-methylphenylbenzoquinone, 2,3,5-trimethylbenzoquinone, 1,4-naphthoquinone, 2,5-dimethoxybenzoquinone, 2,6-dimethylbenzoquinone, bromobenzoquinone, 2,5-dichlorobenzoquinone, cyclohexylbenzoquinone, 2,5-di-n-butylbenzoquinone, p-chlorotoluquinone, toluquinone, 2,5-diphenylbenzoquinone, dodecylbenzoquinone, 2,6-diiodobenzoquinone, fluorobenzoquinone, 2,5-diallylbenzoquinone, 2'-chlorophenylbenzoquinone, 3'-nitrophenylbenzoquinone and benzylbenzoquinone can be used.

In the case of using the quinones or derivatives thereof, as an auxiliary developing agent as a dispersion in the hydrophilic colloid, it is preferred to use gelatin with amino groups which are partially blocked, such as phthalated gelatin, as the hydrophilic colloid. It is particularly preferred to use gelatin where above 97% of the amino groups are phthalated.

In addition to these auxiliary developing agents, other auxiliary developing agents which can be used include polyhydroxy benzene derivatives, amyl gallate and spiro compounds.

The auxiliary developing agent or agents is/are generally used in an amount of about 1/30 to 30 times (molar) the amount of the dye developing agent(s).

In the photosensitive element for color diffusion transfer processing, the silver halide emulsions are combined with the dye developing agent.

The silver halide emulsions used in the present invention are colloidal dispersions of silver chloride, silver bromide, silver bromochloride, silver iodobromide, silver iodobromochloride or a mixture thereof in a hydrophilic colloid. The halogen composition thereof is selected in a conventional manner according to the end-use of the photographic element and the processing conditions. However, it is particularly preferred to use silver iodobromide or silver iodobromochloride where the iodide content is 1 mol% to 10 mol%, the chloride content is less than 30 mol% and the balance is bromide.

The particle size of the silver halide used may be such as is conventionally used or may be fine grained. However, it is preferred that the average particle size be in the range of about 0.1 micron to about 2 microns. Further, it is sometimes desired that each particle have a uniform particle size, depending on the end-use of the photosensitive material. The crystal form of the particles used may be cubic, octahedral or they can be in the mixed crystal form.

The silver halide emulsions can be prepared by conventional methods as described in, for example, *Chimie Photographique*, written by P. Glafkides (Edition 2, 1957, Paul Montel, Paris) Chapters 18–23. For example, a soluble silver salt such as silver nitrate is reacted with a water-soluble halide such as potassium bromide in a solution of a hydrophilic colloid such as gelatin to cause crystal growth in the presence of excess halide or a silver halide solvent such as ammonia. Precipitation processes such as a single or double jet process or a pAg controlled-double jet process can be used.

Removal of soluble salts from the emulsions can be carried out by water washing or dialysis of the emulsion which has been coagulated by cooling, by addition of precipitants such as anionic polymers or anionic surface active agents having sulfo groups, sulfuric acid ester groups or carboxyl groups and pH control, or by the use of acylated proteins such as phthaloyl gelatin as a protective colloid and pH control.

It is preferred that the silver halide emulsions used in the present invention be chemically sensitized by heating using natural sensitizers included in gelatin, e.g., sulfur compounds which are present as impurities therein, sulfur sensitizing agents such as sodium thiosulfate or N,N,N'-triethylthiourea, gold sensitizing agents such as a thiocyanate complex salt or a thiosulfate complex salt of monovalent gold or reduction sensitizing agents such as stannous chloride or hexamethylenetetramine. In the present invention, it is possible to use both emulsions wherein latent images are easily formed on the surface of the particles and emulsions wherein latent images are easily formed in the interior of the particles, as described in U.S. Pat. Nos. 2,592,550 and 3,206,313.

The silver halide emulsions used in the present invention may be stabilized by additives such as 4-hydroxy-6-methyl-1,3,3a,7-tetrazaindene, 5-nitroimidazole, 1-phenyl-5-mercaptotetrazole, 8-chloro-mercuryquinoline, benzenesulfinic acid, pyrocatechin, 4-methyl-3-sulfoethyl-thiazolidine-2-thione and 4-phenyl-3-sulfoethyl-thiazolidine-2-thione. Further, inorganic compounds such as cadmium salts, mercury salts or complex salts of the platinum group elements, such as a chloro-complex salt of palladium, are useful for stabilization of the photosensitive materials. Furthermore, the silver halide emulsions may contain sensitizing compounds such as polyethylene oxide compounds.

The silver halide emulsions used in the present invention may be color sensitized by spectral sensitizing dyes so as to have a desired color sensitivity. Useful spectral sensitizing agents include cyanines, merocyanines, holopolar cyanines, styryls, hemicyanines, oxanols, hemioxanols, etc.

Examples of useful spectral sensitizing agents are described in the above book written by P. Glafkides, Chapters 35–41, and in *The Cyanine Dyes and Related Compounds*, written by F. M. Hamer (interscience). Particularly, cyanine dyes where the nitrogen atom in the basic heterocyclic nucleus is substituted by an aliphatic hydrocarbon group (for example, an alkyl group) having a hydroxyl group, a carboxyl group or a sulfo group, for example, as described in U.S. Pat. Nos. 2,503,776, 3,459,553 and 3,177,210, are most useful in practicing this embodiment of the present invention.

The photosensitive element of the photosensitive materials for color diffusion transfer processing according to the present invention is generally applied to a conventional sheet or film material which does not undergo dimensional changes during processings, such as cellulose nitrate films, cellulose acetate films, cellulose acetate butyrate films, cellulose acetate propionate films, polystyrene films, polyethylene terephthalate films, polycarbonate films, laminates of such films and thin glass films.

In the case that adhesive strength between the support and the photographic emulsion layer is insufficient, a layer having adhesive capability for both of them is applied as a subbing layer. Further, the surface of the support may be subjected to a previous processing such as a corona discharge, ultraviolet irradiation or a flame treatment, etc., in order to further improve the adhesive property.

In the photosensitive element for color diffusion transfer processing used in the present invention, since the silver halide emulsion and the dye developing agent are used in combination for subtractive color photography, a combination of the color sensitivity of the silver halide emulsion and the spectral absorption of the dye images corresponding to desired color reproduction can be suitably selected, for example, a combination of a cyan dye forming dye developing agent + a red-sensitive AgX emulsion, a magenta dye forming dye developing agent + a green-sensitive AgX emulsion and a yellow dye forming dye developing agent + a blue-sensitive AgX emulsion.

For reproduction of natural colors by a subtractive process, a photosensitive element is used which is composed of at least three combinations of an emulsion having a selective spectral sensitivity in a certain wavelength range and a compound forming a dye image having a selective spectral absorption in the same wavelength range. It is particularly useful to use a photosensitive element composed of a combination of a blue-sensitive silver halide emulsion and a compound forming a yellow dye image, a combination of a green-sensitive emulsion and a compound forming a magenta dye image and a combination of a red-sensitive emulsion and a compound forming a cyan dye image. The combination unit of the emulsion and the dye developing agent may be applied so as to have a face-to-face superposed relation in the photosensitive element or may be applied as one layer composed of a mixture of particles thereof. One multilayer structure has been described above. Another example of a multilayer structure consists of a blue-sensitive emulsion layer, a green-sensitive emulsion layer and a red-sensitive emulsion layer which are disposed in this order from the exposing side. In the case of using high speed emulsions containing silver iodide, a yellow filter layer may be disposed between the blue-sensitive emulsion layer and the green-sensitive emulsion layer. The yellow filter contains a yellow colloidal silver dispersion, an oil soluble yellow dye dispersion and an acid dye mordanted by basic polymers or a basic dye mordanted by acid polymers.

It is advantageous that each emulsion layer be separated by an intermediate layer. The intermediate layer inhibits undesirable interactions between emulsion layer units having different color sensitivities. The intermediate layer is conventional and is usually composed of a hydrophilic polymer such as gelatin, polyacrylamide and partially hydrolyzed polyvinyl acetate as well as microporous polymers formed from a latex of hydrophilic polymers and hydrophobic polymers as described in U.S. Pat. No. 3,625,685 and polymers whose hydrophilicity gradually increases in processing compositions, such as calcium alginate as described in U.S. Pat. No. 3,384,483.

The above-described photosensitive element is superposed on the following image receiving element in a face-to-face relationship and processed by spreading an alkaline processing solution between both elements. The image receiving element may be separated after image transfer or the image receiving element may be allowed to remain as it is for viewing without separating (as described in U.S. Pat. No. 3,415,645) where the image receiving layer and the support are transparent and a reflection layer is provided between the image receiving layer and the photosensitive layer.

It is necessary that the image receiving element have a mordanting layer composed of a poly-4-vinylpyridine latex (particularly, in polyvinyl alcohol), polyvinyl pyrrolidone or a polymer containing a quaternary ammonium salt as described in U.S. Pat. No. 3,239,337 and German Patent (OLS) No. 2,450,622. It is preferred that the image receiving element used in the present invention neutralize alkalis transferred therein from the processing composition, e.g., by way of an acid polymer layer as is known in the art. In order to provide the high pH (above 10, preferably above 11) necessary to accelerate the "image forming steps" comprising development of the silver halide emulsion(s) and diffusion of the dye developing agent, the processing composition spread between the emulsion(s) and the image receiving element contains alkalis. After the formation of diffusion transfer images is substantially completed, the pH in the film unit is lowered to a substantially neutral state, namely, below 9, and preferably below 8, to stop the image forming step, whereby changes in image tone with the passage of time are prevented and discoloration of the image caused by high alkalinity and browning of white areas are inhibited. It is advantageous for such purposes to provide in the film unit a neutralization layer containing an acid material in an amount sufficient to neutralize alkali in the processing solution to the above described pH, namely, an equimolar amount or more based on the alkali in the spread processing solution.

Preferred acid materials are those containing acid groups (particularly, a carboxyl group or a sulfonic acid group or precursor groups which give such acid groups upon hydrolysis) having a pKa of 9 or less. Further preferred materials are the higher aliphatic acids such as oleic acid as described in U.S. Pat. No. 2,983,606 and polymers of acrylic acid, methacrylic acid or maleic acid as described in U.S. Pat. No. 3,362,819 and partial esters or acid anhydrides thereof. Examples of high molecular acid materials which can be used for this purpose include copolymers of a vinyl monomer such as ethylene, vinyl acetate or vinyl methyl ether and maleic acid anhydride and the n-butyl semiester thereof, copolymers of butyl acrylate and acrylic acid, and cellulose acetate-acid phthalate, etc. The neutralization layer may contain cellulose nitrate or polymers such as polyvinyl acetate and plasticizers as described in U.S. Pat. No. 3,557,237, in addition to the above-described acid materials. Further, the neutralization layer may be hardened by a cross-linking reaction of a polyfunctional aziridine compound or an epoxy compounds. The neutralizing layer is placed in the image receiving element and/or the photosensitive element. It is particularly advantageous that the neutralization layer be placed between the support for the image receiving layer and the image receiving layer. The acid materials may be incorporated in the film unit by microencapsulating as described in West German Patent (OLS) No. 2,038,254, if desired.

It is preferred that the neutralization layer or the acid material-containing layer used in the present invention be isolated from the layer of processing solution by a neutralization rate controlling layer. The neutralization rate controlling layer has the function of preventing undesirable lowering of transfer image density which is caused by a too rapid decrease of the pH of the processing solution due to the neutralization layer before development of the desired silver halide emulsion layer and formation of the diffusion transfer image, which retards a decrease in pH, until the desired development and transfer are carried out.

In carrying out the present invention, the image receiving portion preferably has a multi-layer structure consisting of a support-neutralization layer-neutralization rate controlling layer-mordanting agent layer (image receiving layer).

The neutralization rate controlling layer comprises one or more polymers such as gelatin, polyvinyl alcohol, polyvinyl propyl ether, polyacrylamide, hydroxypropylmethyl cellulose, isopropyl cellulose, polyvinyl butyral, partially saponified polyvinyl acetate or a copolymer of β-hydroxyethyl methacrylate and ethyl acrylate, etc., as a main component as are conventional, or as are disclosed in U.S. Pat. No. 2,584,030. It is advantageous that the polymers used be hardened by cross-linking using aldehyde compounds, such as formaldehyde or N-methylol compounds. It is preferred that the neutralization rate controlling layer be about 2 to 20 microns thick.

The processing composition used in the present invention is a liquid composition containing processing components necessary to develop the silver halide emulsion(s) and to form the diffusion transfer image(s), wherein the solvent comprises water as a main component and may contain hydrophilic solvents such as methanol or 2-methoxyethanol. The processing composition has a pH necessary to cause development of the emulsion layers and contains alkali in an amount sufficient to neutralize acids formed during the steps of development or dye image formation (for example, a hydrogen halide such as hydrogen bromide or a carboxylic acid such as acetic acid, etc.). As the alkali, salts of alkali metals or alkaline earth metals or amines, such as lithium hydroxide, sodium hydroxide, potassium hydroxide, a dispersion of calcium hydroxide, tetramethylammonium hydroxide, sodium carbonate, trisodium phosphate or diethylamine, etc., can be used. It is particularly preferred to add caustic alkali so as to provide a pH of about 12 or more, particularly about 14 or more, at room temperature. It is further preferred that the processing composition contain hydrophilic polymers such as polyvinyl alcohol of a high molecular weight, hydroxyethyl cellulose or sodium carboxymethyl cellulose, etc. These polymers not only give the processing solution a viscosity of above 1 poise, preferably about 500 to 1,000 poise, to facilitate uniform spreading of the composition during processing, but promote contact of the elements without inter-element shear of the film unit after processing. The polymer membrane can be utilized to inhibit movement of any colored components into the image receiving layer after the conclusion of the formation of the diffusion transfer dye images to prevent deterioration of the images.

The processing composition may advantageously contain, if desired, light absorbing materials such as carbon black or the desensitizers described in U.S. Pat. No. 3,579,333 for the purpose of preventing fogging of the silver halide emulsion layers due to external light at processing.

In color diffusion transfer processing, it is preferred to carry out development in the presence of a diffusible onium compound. As such onium compounds, there are quaternary ammonium compounds, quaternary phosphonium compounds and quaternary sulfonium compounds. Examples of particularly preferred onium compounds include 1-benzyl-2-picolinium bromide, 1-(3-bromopropyl)-2-picolinium-p-toluenesulfonic acid, 1-phenethyl-2-picolinium bromide, 2,4-dimethyl-1-phenethylpyridinium bromide, α-picoline-β-naphthoylmethyl bromide, N,N-diethylpiperidinium bromide, phenethyl phosphonium bromide and dodecyl dimethylsulfonium-p-toluenesulfonate, etc. The onium compounds are preferably added to the alkali processing composition and it is most preferred that the onium compounds are added in an amount of 2 to 15% by weight of the total processing composition. The quality of the transfer color images is greatly improved by carrying out the development in the presence of one or more onium compounds. Examples of other onium compounds and how to use them are described in U.S. Pat. Nos. 3,411,904 and 3,173,786. Further, development inhibitors such as benzotriazole may be added to the processing composition, if desired.

The present invention is illustrated in detail below with reference to several specific working examples. In the examples, all parts are by weight, unless otherwise mentioned, all thicknesses and amounts are dry basis, unless otherwise indicated, and all processings are conducted at room temperature and atmospheric pressure, unless otherwise indicated.

EXAMPLE 1

A photosensitive element (I) was prepared by forming the following layers in the order recited on a transparent cellulose triacetate film having a gelatin subbing layer.

(1) Cyan dye developing agent layer

This layer was produced by dissolving 1 part of Compound 4 described above in a mixture of 1 part of N,N-diethyllaurylamide and 4 parts of cyclohexanone, dispersing the resultant solution in an aqueous gelatin solution using sodium n-dodecylbenzene sulfonate as a dispersing agent and applying the resultant emulsified dispersion onto the subbing layer to provide 1.1 g/m$^2$ of the dye developing agnet, 2.0 g/m$^2$ of gelatin and 1.1 g/m$^2$ of N,N-diethyl laurylamide (mucochloric acid being added in an amount of 0.024 g/m$^2$ as a hardening agent) in the resulting layer.

(2) Red-sensitive emulsion layer

A red-sensitive silver iodobromide emulsion layer (silver iodide: 2mol%) was coated thereon to provide 3.5 g/m$^2$ of silver and 4.0 g/m$^2$ of gelatin (3,3',9-triethyl-5,5'-dichlorothiacarbocyanine iodide being added as a spectral sensitizing dye) in the resulting layer.

(3) Protective layer

The protective layer was prepared by dissolving 1 part of 4'-methylphenyl hydroquinone in a mixture of 1 part of tri-o-cresylphosphate and 1.5 parts of ethyl acetate, dispersing the resultant solution in an aqueous gelatin solution using sodium n-dodecylbenzene sulfonate as a dispersing agent and applying the resultant emulsified dispersion to the red-sensitive emulsion layer to provide 0.20 g/m$^2$ of 4'-methylphenylhydroquinone, 0.60 g/m$^2$ of gelatin and 0.20 g/m$^2$ of tri-o-cresyl phosphate (mucochloric acid was added in an amount of 0.003 g/m$^2$ as a hardening agent) in the resulting layer.

Photosensitive element (II) was produced for comparison with photosensitive element (I) in the same manner as photosensitive element (I) except the cyan dye developing agent layer was as follows.

Cyan Dye Developing Agent Layer

This layer which was prepared by dissolving 1 part of 1,4-(bis-β-hydroquinonyl-α-methylpropylamino)-5,8-dihydroxy-anthraquinone (Comparison Compound A; described in U.S. Pat. No. 3,209,016) in a mixture of 2 parts of N,N-diethyl laurylamide and 2.5 parts of cyclohexanone, dispersing the resultant solution in an aqueous gelatin solution using sodium n-dodecylbenzene sulfonate as a dispersing agent in a conventional amount, e.g., 5% by weight of the gelatin, and applying the resultant emulsified dispersion to provide 0.60 g/m$^2$ of the dye developing agent, 2.0 g/m$^2$ of gelatin and 1.2 g/m$^2$ of N,N-diethyl laurylamide (mucochloric acid was added as a hardening agent an an amount of 0.02 g/m$^2$) in the resulting layer.

An image receiving element was then produced by forming the following layers in the order given on a transparent polyethylene terephthalate film.

(1) Acid Polymer Layer

This layer was prepared by applying a 20% solution of a butyl half-ester of maleic acid anhydride-vinyl methyl ether (1:1) copolymer (average molecular weight: about 100,000) in methyl ethyl ketone so as to provide a $30\mu$ dry thickness (formaldehyde bisulfite adduct was added as a hardening agent in an amount of 0.03 part per part of the polymer).

(2) Neutralization Rate Controlling Layer

This layer was prepared by dissolving 1 part of poly-2-hydroxyethyl methacrylate (average molecular weight: about 60,000) in a mixture of 3 parts of acetone and 1 part of water, and applying the resultant solution to form a dry film having a $7\mu$ thickness (trimethylol melamine was incorporated as a hardening agent in the amount of 0.03 part per part of the polymer).

(3) Image Receiving Layer

This layer was prepared by dissolving 1 part of poly-4-vinyl pyridine (average molecular weight: about 80,000) 2 parts of polyvinyl alcohol (saponification value: 98%, average molecular weight: about 80,000) and 0.05 part of 1-phenyl-5-mercaptotetrazole in 150 parts of water containing 0.5 part of glacial acetic acid and applying the resultant solution to provide 3.2 g/m² of poly-4-vinyl pyridine, 3.2 g/m² of polyvinyl alcohol and 0.16 g/m² of 1-phenyl-5-mercaptotetrazole (trimethylolmelamine was added as a hardening agent in the amount of 0.03 part per part of the polymer) in the resulting layer.

Photosensitive elements (I) and (II) were exposed to light of 20 C.M.S. through their supports via a red filter (Fuji Filter SC-641) and a light wedge with tungsten light having a 2854° K. color temperature. They were then superposed on the image receiving element in darkness and development transfer processing was carried out by spreading the following processing solution between the photosensitive element and the image receiving layer in an amount of 1.0 cc per 100 cm² of the image receiving element.

| Water | 100 | cc |
|---|---|---|
| Potassium hydroxide | 11.2 | g |
| Carboxymethyl cellulose | 3.5 | g |
| Benzotriazole | 1.5 | g |
| N-benzyl-α-picolinium bromide | 2.0 | g |
| Titanium dioxide | 50 | g |

After 20 minutes, it was observed through the support of the image receiving element that a cyan color image had been transferred to a white area composed of the titanium dioxide included in the processing solution layer. Photosensitive emenents (I) and (II) were compared after this 20 minute period by measuring the maximum density (Dmax), minimum density (Dmin) and degree of lowering of sensitivity upon exposure to light from the support side through the dye developing agent layer. The results are shown in the following table.

| Photosensitive Element | Characteristic Value | | |
|---|---|---|---|
| | Density | | Sensitivity Lowering |
| | (Dmax) | (Dmin) | ($-\Delta$log E) |
| (I) | 2.30 | 0.35 | 0.01 |
| (II) | 2.40 | 0.28 | 2.40 |

In the above table, the red density value is that determined by a MACBETH RD-514 densitometer through the support of the image receiving element. The lowering of sensitivity value ($-\Delta$log E) is the difference between the sensitivity value in the case of exposure through the reverse side of the support (the red-sensitive emulsion layer was exposed to light without the light passing through the dye developing agent layer) and the sensitivity value in the case of exposure through the support (the blue-sensitive emulsion layer was exposed to light through the dye developing agent layer). The exposed sample (exposure was from the side carrying the emulsion, etc., layers) was processed in the same manner as described above.

The sensitivity value is the logarithmic value (log E) of exposure (E) corresponding to a value 0.2 lower than the maximum density of the transferred image on the image receiving element. In photosensitive elements (I) and (II), the sensitivity values in the case of exposure from the side of the support carrying the emulsion, etc., layers were nearly identical.

It will be understood from the above table that photosensitive elements (I) and (II) both satisfy photographic requirements from the viewpoint of maximum density and minimum density of the transferred dye image on the image receiving element, but the degree of sensitivity lowering is lower in photosensitive element (I), wherein Compound 4 of the present invention was used, than in photosensitive element (II).

Further, in order to compare absorption by the dye developing agent layer in the photosensitive element before processing, the spectral absorption of the sample which was prepared by applying only the above-described dye developing agent layer to the transparent cellulose acetate film having a gelatin subbing layer was determined as the transmission density. The result is shown in FIG. 2. As is clear from this Figure, in the case of using Compound 4 (Curve 3), the absorption is shifted to the short wavelength side and the light absorption coefficient becomes small as compared with the case of using Compound A (Curve 4). Accordingly, it will be understood that spectral sensitivity when the red-sensitive emulsion layer associated with the dye developing agent according to subtractive color photography is exposed to light through the dye developing agent layer is not as harmed when Compound 4 is used.

The above-described photosensitive element (I) was exposed to light and subjected to development transfer processing in the same manner as described above. After 8 minutes, the image receiving element was separated and washed with water. The spectral absorption of the transferred dye image in nonexposed areas of the sample is shown in FIG. 3. It will be understood that the hue of the dye transferred to the image receiving element is the desirable cyan color in the case of using Compound 4 of the present invention.

It is also clear from the absorption spectrum of Compound 4 as shown in FIG. 2 and FIG. 3 that a temporary short wavelength absorption is attained by a chemical alteration of the auxochrome amino group, and color recovery is accomplished by alkali hydrolysis in the processing solution.

EXAMPLE 2

Severe environmental tests ((1) at a temperature of 50° C. and a relative humidity of 30% for 5 days; (2) at a temperature of 50° C. and a relative humidity of 60% for 5 days; and (3) at a temperature of 50° C. and a relative humidity of 80% for 5 days) were carried out on a sample which was prepared by applying only the dye developing agent layer containing Compound 4 as was used in Example 1 to a cellulose triacetate support, and spectral absorption was determined as transmission density. After all of these severe environmental tests, nearly the same spectrum as that of Compound 4 in FIG. 2 was obtained. It will be understood from these results that the compound of the present invention is a stable dye developing agent which does not substantially revert to its original color during storage of the photosensitive material, i.e., once altered to have an absorption in the short wavelength region there is no tendency to be hydrolyzed to cause a shift of the absorption towards the long wavelength region during storage.

EXAMPLE 3

Photosensitive element (III) was produced by forming the following layers in the recited order on a transparent polyethylene terephthalate film having a gelatin subbing layer.

(1) Yellow Dye Developing Agent Layer

This layer was prepared by dissolving 1 part of 5-acetyl-8-(m-hydroquinonylmethylphenylazo)-5-quinolinol in a mixture of 1 part of N,N-diethyl laurylamide and 4 parts of cyclohexanone, dispersing the resultant solution in an aqueous gelatin solution using sodium n-dodecylbenzene sulfonate as a dispersing aid (5% by weight of gelatin), and applying the resultant dispersion to provide 0.6 g/m$^2$ of the dye developing agent, 1.7 g/m$^2$ of gelatin and 0.6 g/m$^2$ of N,N-diethyl laurylamide in the resulting layer.

(2) Blue-Sensitive Emulsion Layer

A blue-sensitive silver iodobromide layer (containing 2 mol% silver iodide) was prepared by coating a layer which contained 2.3 g/m$^2$ of silver and 1.7 g/m$^2$ of gelatin.

(3) Intermediate layer

This layer of colloidal silver was prepared by coating a layer of 0.3 g/m$^2$ of silver and 3.5 g/m$^2$ of gelatin (mucochloric acid was added as a hardening agent in an amount of 0.035 g/m$^2$).

(4) Magenta Dye Developing Agent Layer

This layer which was prepared by dissolving 1 part of 1-acetoxy-2-[p-(β-hydroquinonylethyl)phenylazo]-4-(1″,4‴- dioxapentyl)-1-naphthol in a mixture of 1 part of N,N-diethyl laurylamide and 4 parts of cyclohexanone, dispersing the resultant solution in an aqueous solution of gelatin using sodium n-dodecylbenzene sulfonate as a dispersing aid and applying the resultant emulsified dispersion to provide 0.6 g/m$^2$ of the dye developing agent, 1.2 g/m$^2$ of gelatin and 0.6 g/m$^2$ of N,N-diethyl laurylamide in the resulting layer.

(5) Green-Sensitive Emulsion Layer

The green-sensitive silver iodobromide emulsion layer (iodine: 2 mol%) was prepared by coating to provide 1.7 g/m$^2$ of silver and 1.3 g/m$^2$ of gelatin (3,3′,9-triethyl-5,5′-diphenyloxacarbocyanine bromide was used as a spectral sensitizing dye) in the resulting layer.

(6) Intermediate layer

A gelatin layer which was prepared by applying 3.0 g/m$^2$ of gelatin (mucochloric acid was added as a hardening agent in the amount of 0.03 g/m$^2$) to the above layer.

(7) Cyan dye developing agent layer

This layer which was prepared by dissolving 1 part of Compound 4 in a mixture of 1 part of N,N-diethyl laurylamide and 4 parts of cyclohexanone, dispersing the resultant solution in an aqueous gelatin solution using sodium n-dodecylbenzene sulfonate as a dispersing aid and applying the resultant emulsified dispersion to provide 1.0 g/m$^2$ of the dye developing agent, 1.1 g/m$^2$ of gelatin and 1.0 g/m$^2$ of N,N-diethyl laurylamide in the resulting layer.

(8) Red-sensitive emulsion layer

A red-sensitive silver iodobromide emulsion layer (iodine: 2 mol%) was prepared by coating to provide 1.5 g/m$^2$ of silver and 1.3 g/m$^2$ of gelatin (3,3′,9-triethyl-5,5′-dichlorothiacarbocyanine iodide was used as a spectral sensitizing dye) in the resulting layer.

(9) Protective layer

This layer was prepared by dissolving 1 part of 4′-methylphenyl hydroquinone in a mixture of 1 part of tri-o-cresyl phosphate and 1.5 parts of ethyl acetate, dispersing the resultant solution in an aqueous gelatin solution using sodium n-dodecylbenzene sulfonate as a dispersing aid and applying the resultant emulsified dispersion to provide 0.45 g/m$^2$ of 4′-methylphenyl hydroquinone, 1,3 g/m$^2$ of gelatin and 0.45 g/m$^2$ of tri-o-cresyl phosphate (mucochloric acid was added as a hardening agent in an amount of 0.013 g/m$^2$) in the resulting layer.

An image receiving element was then produced by applying the following layers in the order given to a transparent polyethylene terephthalate film.

(1) Acid polymer layer

The same layer as in Example 1.

(2) Neutralization rate controlling layer

This layer was prepared by dissolving 1 part of a 2-hydroxyethyl methacrylate-butyl methacrylate (4:1) copolymer (average molecular weight: 60,000) in a mixture of 4 parts of ethanol and 1 part of water and applying the resultant solution to form a layer 10μ thick (trimethylolmelamine was added as a hardening agent in an amount of 0.03 part per part of the polymer).

(3) Image receiving layer

The same layer as in Example 1.

The thus-prepared photosensitive element was then once exposed to a light wedge from the support side using yellow, magenta, cyan, red, green and blue irradiation. Then the same processing solution as in Example 1 was spread between the exposed photosensitive element and the image receiving element in an amount of 1.0 cc per 100 cm$^2$ of the image receiving element to effect transfer development. After 20 minutes of development processing, one could view formed yellow, magenta, cyan, red, green and blue colors through the support of the image receiving element without separating the image receiving element.

EXAMPLE 4

The procedure of Example 1 was carried out except for using Compounds 3, 5, 7, 9 or 10 in place of Compound 4. The transfer density and sensitivity lowering were determined as in Example 1 to be as follows.

| | Characteristic Value | | |
|---|---|---|---|
| | Density | | Sensitivity Lowering |
| Compound | (Dmax) | (Dmin) | ($-\Delta\log E$) |
| 3 | 1.20 | 0.30 | |
| 5 | 2.25 | 0.35 | |
| 7 | 2.10 | 0.33 | about 0.01 |
| 9 | 2.20 | 0.35 | in all cases |
| 10 | 2.45 | 0.37 | |

The degree of sensitivity lowering was very low in any case where a compound of the present invention was used, as compared with that ($-\Delta\log E = 2.4$) when the comparison dye developing agent of Example 1 was used. The hue of the dye transferred to the image receiving layer was nearly the same as that of the compound, and was a suitable cyan color. It became clear that the compounds of this example were suitable as temporary short wavelength absorption type dye developing agents because they had a low filter desensitizing effect.

While the invention has been described in detail and with reference to specific embodiments thereof, it will be apparent to one skilled in the art that various changes and modifications can be made therein without departing from the spirit and scope thereof.

What is claimed is:

1. A photographic element comprising a support having thereon at least one silver halide emulsion layer having a dye developing agent associated therewith, said dye developing agent being represented by the formula (I)

$$A(-N(X)-COY)_n \quad (I)$$

wherein A represents an anthraquinone dye moiety substituted in one or more of the 1, 4, 5 or 8 positions with the amino group shown in the formula, X represents a hydrogen atom, an aliphatic hydrocarbon group, an alicyclic hydrocarbon group, an aryl group or a heterocyclic group, at least one of A and X contains an o-dihydroxyphenyl group or a p-dihydroxyphenyl group as a dye developing agent moiety, n is an integer of 1 to 4, and COY represents a group which is released from the nitrogen atom at a pH of above 9, wherein Y is a group represented by the formulae (II), (III), (IV), (V), (VI) or (VII):

—OCH₂CH₂SO₂R (II)
—CF₃ (III)

(IV)

—COOR (V)
—COOH (VI)
—OCH₂CH₂Q (VII)

wherein R represents an aliphatic hydrocarbon group, an alicyclic hydrocarbon group or an aryl group; Z represents a hydrogen atom, a halogen atom, a lower alkyl group, a nitro group or a cyano group; Q represents a halogen atom; and m is an integer of 1 to 3.

2. The photographic element as set forth in claim 1, wherein said Y is a group represented by the formulae (II), (III) or (IV).

3. The photographic element as set forth in claim 2, wherein said Y is a group represented by the formula (II).

4. Photographic element as set forth in claim 3, wherein Y has the formula:

wherein X' is selected from the group consisting of methyl, chlorine, bromine or nitro.

5. The photographic element as set forth in claim 1, wherein said R represents an alkyl group having 1 to 20 carbon atoms, an alkenyl group having 1 to 20 carbon atoms, an alkynyl group having 1 to 20 carbon atoms, a substituted or unsubstituted 5- or 6-membered alicyclic hydrocarbon group or a monocyclic or bicyclic aryl group.

6. The photographic element as set forth in claim 1, wherein said lower alkyl group is an alkyl group having up to 5 carbon atoms.

7. Photographic element as set forth in claim 1, wherein said anthraquinone dye moiety is selected from the group consisting of an anthrapyrimidine, an anthrapyridone or a pyrazolanthrone dye residue.

8. Photographic element as set forth in claim 1, wherein said aliphatic hydrocarbon group represented by X and R is selected from the group consisting of an alkyl, an alkenyl or an alkinyl group having 1 to 20 carbon atoms.

9. The photographic element set forth in claim 8, wherein said aliphatic hydrocarbon group has 1 to 10 carbon atoms.

10. Photographic element as set forth in claim 8, wherein said aliphatic hydrocarbon group is substituted with a member selected from the group consisting of a halogen atom, a carboxyl group, a hydroxyl group or an amide group.

11. Photographic element as set forth in claim 1, wherein said alicyclic hydrocarbon group represented by X and R is a 5- or 6-membered alicyclic hydrocarbon group.

12. Photographic element as set forth in claim 11, wherein said alicyclic hydrocarbon group is substituted with a member selected from the group consisting of a halogen atom, a carboxyl group, a hydroxyl group or an amide group.

13. Photographic element as set forth in claim 1, wherein said alicyclic hydrocarbon group is substituted with an alkyl group having up to 5 carbon atoms.

14. Photographic element as set forth in claim 1, wherein said aryl group represented by X and R is mono-cyclic.

15. Photographic element as set forth in claim 1, wherein said aryl group represented by X and R is a phenyl group.

16. Photographic element as set forth in claim 1, wherein said aryl group represented by X and R is bicyclic.

17. Photographic element as set forth in claim 1, wherein said aryl group represented by X and R is a naphthyl group.

18. Photographic element as set forth in claim 1, wherein said aryl group represented by X and R is substituted with a member selected from the group consisting of a halogen atom, an alkyl group having up to 5 carbon atoms, an alkoxy group having up to 5 carbon atoms, a hydroxyl group, a carboxyl group and an amide group.

19. Photographic element as set forth in claim 1, wherein said heterocyclic group is selected from the group consisting of a furan group, a pyrrole group, a thiazole group, an imidazole group and a pyridine group.

20. Photographic element as set forth in claim 19, wherein said heterocyclic group is substituted with a member selected from the group consisting of an alkyl group having up to 5 carbon atoms, a halogen atom, a hydroxyl group, a carboxyl group or an amide group.

21. Photographic element as set forth in claim 1, wherein moiety A has the formula:

when n is 2.

22. Photographic element as set forth in claim 1 wherein said dye developing agent is represented by the formula wherein R represents an aliphatic group, alicyclic group or aryl group and X is selected from the group consisting of an aliphatic hydrocarbon group, an alicyclic hydrocarbon group, an aryl group or a heterocyclic group each containing an o-dihydroxyphenyl or p-dihydroxyphenyl group.

23. The element of claim 22 wherein X is an alkyl group having 1 to 20 carbon atoms.

24. In photosensitive materials for color diffusion transfer processing comprising at least one photosensitive element comprising a support, a silver halide emulsion layer and an adjacent hydrophilic colloid layer wherein the hydrophilic colloid layer contains a dye developing agent having absorption in the spectral sensitization wavelength range of the silver halide emulsion and is on the support side of said adjacent silver halide emulsion layer, and said photosensitive materials are exposed to light from the support side upon use, the improvement wherein said hydrophilic colloid layer contains a dye developing agent represented by the formula (I)

wherein A represents an anthraquinone dye moiety substituted in one or more of the 1, 4, 5 or 8 positions with the amino group shown in the formula, X represents a hydrogen atom, an aliphatic hydrocarbon group, an alicyclic hydrocarbon group, an aryl group or a heterocyclic group, at least one of A and X contains an o-dihydroxyphenyl group or a p-dihydroxyphenyl group as a dye developing agent moiety, n is an integer of 1 to 4, and COY represents a group which is released from the nitrogen atom at a pH of above 9, wherein Y is a group represented by the formulae (II), (III), (IV), (V), (VI) or (VII):

—COOR (V)
—COOH (VI)
—OCH$_2$CH$_2$Q (VII)

wherein R represents an aliphatic hydrocarbon group, an alicyclic hydrocarbon group or an aryl group; Z represents a hydrogen atom, a halogen atom, a lower alkyl group, a nitro group or a cyano group; Q represents a halogen atom; and m is an integer of 1 to 3.

25. The photosensitive materials as set forth in claim 24, wherein said Y is a group represented by the formula (II).

26. The photographic material as set forth in claim 25, wherein Y has the formula:

wherein X' is selected from the group consisting of methyl, chlorine, bromine or nitro.

27. The photosensitive material as set forth in claim 24, wherein said Y is a group represented by the formulae (II), (III) or (IV).

28. The photographic material as set forth in claim 24 wherein said anthraquinone dye moiety is selected from the group consisting of anthrapyrimidine, anthrapyridone or pyrazolanthrone dye residue.

29. The photographic material as set forth in claim 24 wherein moiety A has the formula:

when n is 2.

30. The photographic material of claim 24 wherein said dye developing agent is represented by the formula wherein R represents an aliphatic group, alicyclic group or aryl group and X is selected from the group consisting of an aliphatic hydrocarbon group, an alicyclic hydrocarbon group, an aryl group or a heterocyclic group each containing an o-dihydroxyphenyl or p-dihydroxyphenyl group.

31. The material of claim 24 wherein X is an alkyl group having 1 to 20 carbon atoms.

* * * * *